US012211463B2

(12) United States Patent
Reinhard et al.

(10) Patent No.: US 12,211,463 B2
(45) Date of Patent: Jan. 28, 2025

(54) DEVICE AND METHOD FOR TRANSITION BETWEEN LUMINANCE LEVELS

(71) Applicant: InterDigital CE Patent Holdings, Paris (FR)

(72) Inventors: Erik Reinhard, Hede-Bazouges (FR); Pierre Andrivon, Liffre (FR); David Touze, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 308 days.

(21) Appl. No.: 17/612,520

(22) PCT Filed: May 19, 2020

(86) PCT No.: PCT/EP2020/063941

§ 371 (c)(1),
(2) Date: Nov. 18, 2021

(87) PCT Pub. No.: WO2020/239534

PCT Pub. Date: Dec. 3, 2020

(65) Prior Publication Data

US 2022/0270568 A1 Aug. 25, 2022

(30) Foreign Application Priority Data

May 24, 2019 (EP) .................................... 19305654

(51) Int. Cl.
*G09G 5/10* (2006.01)

(52) U.S. Cl.
CPC ....... *G09G 5/10* (2013.01); *G09G 2320/0626* (2013.01)

(58) Field of Classification Search
CPC ......................... G09G 5/10; G09G 2320/0626
See application file for complete search history.

(56) References Cited

U.S. PATENT DOCUMENTS 7,034,788 B2 * 4/2006 Someya ............... G09G 3/3611 345/89
8,345,070 B2 * 1/2013 Suen .................... G09G 3/3611 348/451

(Continued)

FOREIGN PATENT DOCUMENTS

CN 1477880 A 2/2004
CN 100418351 C 9/2008

(Continued)

OTHER PUBLICATIONS

Crawford, B. H. "Visual Adaptation in Relation to Brief Conditioning Stimuli", Proc. R. Soc. Lond. B 134, vol. No. 875, Jul. 24, 1946, pp. 283-302.

(Continued)

*Primary Examiner* — Gene W Lee
(74) *Attorney, Agent, or Firm* — Condo Roccia Koptiw LLP

(57) ABSTRACT

A device and a method for outputting video content for display on a display. At least one processor displays a first video content on the display, receives a second video content to display, obtains a first luminance value for the first video content, extracts a second luminance value from the second video content, adjusts a luminance of a frame of the second video content based on the first and second luminance values and outputs the frame of the second video content for display on the display. The video content can comprise frames and a luminance value can be equal to an average frame light level for the most recent L frames of the corresponding video content. In case a luminance value is unavailable, a Maximum Frame Average Light Levels of the first video content and the second video content can be used instead.

18 Claims, 3 Drawing Sheets

(56) References Cited

U.S. PATENT DOCUMENTS

| | | | | |
|---|---|---|---|---|
| 2004/0036704 | A1 | 2/2004 | Han et al. | |
| 2013/0163868 | A1 | 6/2013 | Wang et al. | |
| 2016/0249009 | A1 | 8/2016 | Messmer | |
| 2016/0316207 | A1 | 10/2016 | Minoo et al. | |
| 2018/0338104 | A1 | 11/2018 | Pines et al. | |
| 2019/0052833 | A1 | 2/2019 | Sakurai et al. | |
| 2020/0027408 | A1* | 1/2020 | Xi | G09G 3/3426 |
| 2020/0410651 | A1* | 12/2020 | Peana | G06F 3/1415 |
| 2021/0335273 | A1* | 10/2021 | Meng | G09G 3/3208 |

FOREIGN PATENT DOCUMENTS

| | | | |
|---|---|---|---|
| CN | 102763134 | A | 10/2012 |
| CN | 106604122 | A | 4/2017 |
| CN | 107786865 | A | 3/2018 |
| CN | 108109180 | A | 6/2018 |
| CN | 108495054 | A | 9/2018 |
| EP | 2 237 221 | A1 | 10/2010 |
| JP | 2017046040 | A | 3/2017 |
| JP | 2018017795 | A | 2/2018 |
| JP | 2018097196 | A | 6/2018 |
| WO | WO 2018217887 | A1 | 11/2018 |

OTHER PUBLICATIONS

Reinhard et al., "Photographic Tone Reproduction for Digital Images", Association for Computing Machinery (ACM), ACM Transactions on Graphics, vol. 21, Issue 3, Jul. 1, 2002, 10 pages.

Wikipedia article, "Leaky Integrator", version dated Jul. 15, 2017, URL: https://en.wikipedia.org/wiki/Leaky_integrator, 2 pages.

Reinhard et al., "Chapter 6—The Human Visual System and HDR Tone Mapping", in High Dynamic Range Imaging, Acquisition, Display, and Image-Based Lighting, ELSEVIER, Amsterdam, 2006, pp. 187-219.

Anonymous, "Image Parameter Values for High Dynamic Range Television for Use in Production and International Programme Exchange", International Telecommunication Union, Radiocommunication Sector of ITU, Recommendation ITU-R BT.2100-2, Jul. 2018, 15 pages.

Gerstner et al, "Neuronal Dynamics: From single neurons to networks and models of cognition [Online Book]", URL: https://neuronaldynamics.epfl.ch/online/Ch1.S3.html, Foundations of Neuronal Dynamics, 1.3 Integrate-And-Fire Models, Sep. 8, 2014, 11 pages.

Kalloniatis et al., "Webvision6—The Organization of the Retina and Visual System[Online Book]", URL: https://webvision.med.utah.edu/book/part-viii-psychophysics-of-vision/light-and-dark-adaptation/, Part VIII: Psychophysics of Vision, Light and Dark Adaptation, Jul. 9, 2007, 14 pages.

English Translation for CN100418351C, as published Sep. 10, 2008.

Anonymous, "Mastering Display Color Volume Metadata Supporting High Luminance and Wide Color Gamut Images", The Society of Motion Picture and Television Engineers (SMPTE), SMPTE Standard, Document: SMPTE ST 2086:2014, Oct. 13, 2014, 6 pages.

English Translation for CN106604122 A, as published Apr. 26, 2017.

Ledda et al., "A Local Model of Eye Adaptation for High Dynamic Range Images", Association for Computing Machinery (ACM), AFRIGRAPH '04: Proceedings of the 3rd international conference on Computer graphics, virtual reality, visualisation and interaction in Africa, Nov. 3, 2004, 11 pages.

Turner Clay S., "Leaky Integrator", Internet Article URL: http://www.claysturner.com/dsp/Leaky%20Integrator.pdf, Dated: Jul. 7, 2008, 1 page.

English Translation for JP2017046040A, as published on Mar. 2, 2017.

Mote F. A., et al. "The Effect of Varying the Intensity and the Duration of Preexposure upon Foveal Dark Adaptation in the Human Eye", The Journal of General Physiology 34, No. 5 (1951), 18 pages.

Wikipedia article, "Biological Neuron Model", version dated Feb. 9, 2019, URL: hhttps://en.wikipedia.org/w/index.php?title=Biological_neuron_model&ol, 22 pages.

Anonymous, "Reference Electro-Optical Transfer Function for Flat Panel Displays used in HDTV Studio Production" International Telecommunication Union, Radiocommunication Sector of ITU, Recommendation ITU-R BT.1886, Mar. 2011, 7 pages.

Pianta et al., "Characterisation of Dark Adaptation in Human Cone Pathways: an Application of the Equivalent Background Hypothesis", The Journal of Physiology, vol. 528, No. 3, Feb. 4, 2000, 18 pages.

Bartlett, et al., "Dark and Light Adaptation", Vision and Visual Perception, Chapter 8, New York, 1965, 25 pages.

Gradshteyn, et al., "Table of Integrals, Series, and Products. Eight Edition", Academic Press, 2014, 1156 pages.

Pirenne, et al., "Dark-Adaptation and Night Vision, Chapter 5", Academic Press, 1962, 30 pages.

Reinhard, et al., "High Dynamic Range Imaging: Acquisition, Display, and Image-Based Lighting, Second Edition", 2010, 673 pages.

CTA Standard, "Hdr Static Metadata Extensions", CTA-861.3-A (Formerly CEA-861.3), definition of MaxCLL and MaxFALL, Jul. 2016, 17 pages.

Mote et al., "The Effect of Varying the Intensity and the Duration of Preexposure Upon Subsequent Dark Adaptation in the Human Eye", Journal of Comparative and Physiological Psychology, vol. 46, No. 1, 1953, pp. 49-55.

* cited by examiner

DEVICE AND METHOD FOR TRANSITION BETWEEN LUMINANCE LEVELS

CROSS REFERENCE TO RELATED APPLICATIONS

This application is a U.S. National Stage Application under 35 U.S.C. 371 of International Patent Application No. PCT/EP2020/063941, filed May 19, 2020, which is incorporated herein by reference in its entirety.

This application claims the benefit of European Patent Application No. 19305654, filed May 24, 2019, which is incorporated herein by reference in its entirety.

TECHNICAL FIELD

The present disclosure relates generally to management of luminance for content with high luminance range such as High Dynamic Range (HDR) content.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A notable difference between High Dynamic Range (HDR) video content and Standard Dynamic Range (SDR) video content is that HDR provides an extended luminance range, which is to say that HDR video content can have deeper blacks and brighter whites. As an example, some present HDR displays can achieve a luminance of 1000 $cd/m^2$ while typical SDR displays can achieve 300 $cd/m^2$.

This means that, when displayed on HDR displays, HDR video content will, when it comes to luminance, typically be less uniform than SDR video content displayed on SDR displays.

Naturally, the greater luminance range allowed by HDR video content can be used knowingly by content directors and content producers to create visual effects based on luminance differences. However, a flipside of this is that switching between broadcast video content and also Over-the-top (OTT) video content can result in undesired luminance changes, also called (luminance) jumps.

Jumps can occur when switching between HDR video content and SDR video content or between different HDR video contents (while this rarely, if at all, is a problem when switching between different SDR video content). As such, they can for example occur when switching between different video content in a single HDR channel (a jump up or a jump down), from a SDR channel to a HDR channel (typically a jump up), from a HDR channel to a SDR channel (typically a jump down), or from a HDR channel to another HDR channel (a jump up or a jump down).

It will be appreciated that such jumps can cause surprise, even discomfort, in viewers, but jumps can also render certain features invisible to users owing to the fact that the eye needs time to adapt, in particular when the luminance is decreased significantly.

JP 2017-46040 appears to describe gradual luminance adaptation when switching between SDR video content and HDR video content so that a luminance setting of 100% (for example corresponding to 300 $cd/m^2$) when displaying SDR video content is gradually lowered to 50% (for example also corresponding to 300 $cd/m^2$) when displaying HDR video content (for which a luminance setting of 100% can correspond to 6000 $cd/m^2$). However, the solution appears to be limited to situations when HDR video content follows SDR video content and vice versa.

US 2019/0052833 seems to disclose a system in which a device that displays a first HDR video content and receives user instructions to switch to a second HDR video content displays a mute (and monochrome) transition video during which the luminance is gradually changed from a luminance value associated with (e.g. embedded in) the first content to a luminance value associated with the second content. A given example of a luminance value is Maximum Frame Average Light Level (MaxFALL). One drawback of this solution is that MaxFALL is not necessarily suitable for use at the switch since the value is static within a content item (i.e. the same for the whole stream) or at least within a given scene and thus can be high if a short part of the content item is luminous while the rest is not and thus not being representative of darker parts of the content item.

It will thus be appreciated that there is a desire for a solution that addresses at least some of the shortcomings of luminance levels when switching to or from HDR video content. The present principles provide such a solution.

SUMMARY OF DISCLOSURE

In a first aspect, the present principles are directed to a method in a device for outputting video content for display on a display. At least one processor of the device displays a first video content on the display, receives a second video content to display, adjusts luminance of a frame of the second video content based on a first luminance value and a second luminance value, the first luminance value equal to an average frame light level for at least a plurality of the L most recent frames of the first video content, the second luminance value extracted from metadata of the second video content and outputs the frame of the second video content for display on the display.

In a second aspect, the present principles are directed to a device for processing video content for display on a display, the device comprising an input interface configured to receive a second video content to display and at least one processor configured to display a first video content on the display, adjust a luminance of a frame of the second video content based on a first luminance value equal to an average frame light level for at least a plurality of the L most recent frames of the first video content and a second luminance value extracted from metadata of the second video content, and output the frame of the second video content for display on the display.

In a third aspect, the present principles are directed to a method for processing video content comprising a first part and a second part. At least one processor of a device obtains the first part, obtains the second part, obtains a first luminance value for the first part, obtains a second luminance value for the second part, adjusts a luminance of a frame of the second part based on the first and second luminance values, and stores the luminance adjusted frame of the second part.

In a fourth aspect, the present principles are directed to a device for processing video content comprising a first part and a second part, the device comprising at least one processor configured to obtain the first part, obtain the second part, obtain a first luminance value for the first part, obtain a second luminance value for the second part, and adjust a luminance of a frame of the second part based on the first and second luminance values, and an interface configured to output the luminance adjusted frame of the second part for storage.

In a fifth aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Features of the present principles will now be described, by way of non-limiting example, with reference to the accompanying drawings, in which.

DESCRIPTION OF EMBODIMENTS

Figure 1:
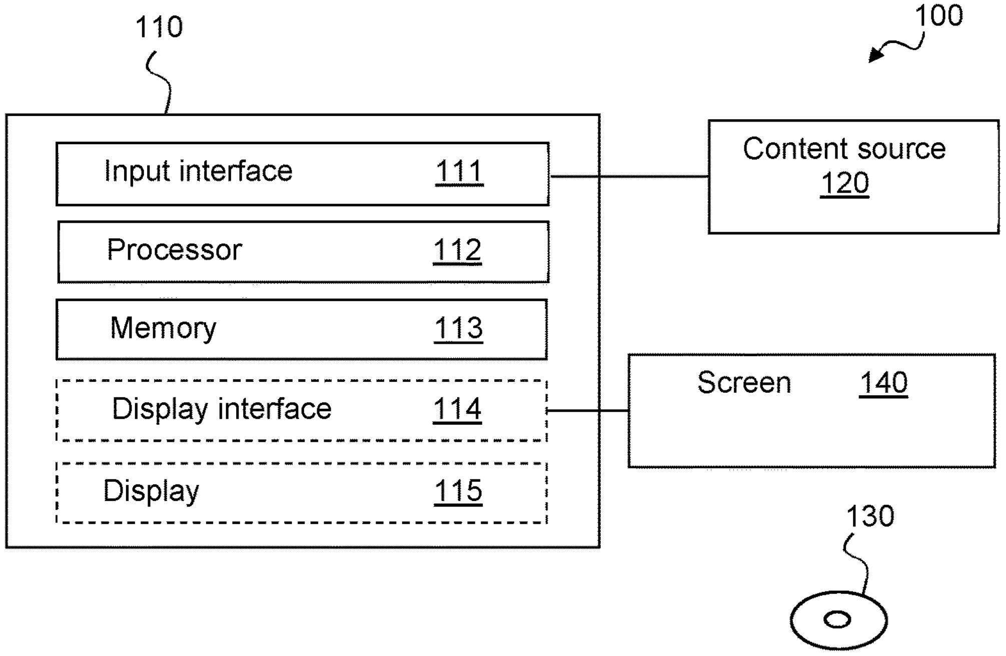
FIG. 1 illustrates a system according to an embodiment of the present principles.

FIG. 1 illustrates a system 100 according to an embodiment of the present principles. The system 100 includes a presentation device 110 and a content source 120; also illustrated is a non-transitory computer-readable medium 130 that stores program code instructions that, when executed by a processor, implement steps of a method according to the present principles. The system can further include a display 140.

The presentation device 110 includes at least one input interface 111 configured to receive content from at least one content source 120, for example a broadcaster, an OTT provider and a video server on the Internet. It will be understood that the at least one input interface 111 can take any suitable form depending on the content source 120; for example a cable interface or a wired or wireless radio interface (for example configure for Wi-Fi or 5G communication).

The presentation device 110 further includes at least one hardware processor 112 configured to, among other things, control the presentation device 110, process received content for display and execute program code instructions to perform the methods of the present principles. The presentation device 110 also includes memory 113 configured to store the program code instructions, execution parameters, received content—as received and processed—and so on.

The presentation device 110 can further include a display interface 114 configured to output processed content to an external display 140 and/or a display 115 for displaying processed content.

It is understood that the presentation device 110 is configured to process content with a high luminance range, such as HDR content. Typically, such a device is also configured to process content with a low luminance range, such as SDR content (but also HDR content with a limited luminance range). The external display 140 and the display 115 are typically configured to display the processed content with a high luminance range (including the limited luminance range).

In addition, the presentation device 110 typically includes a control interface (not shown) configured to receive instructions, directly or indirectly (such as via a remote control) from a user.

In an embodiment, the presentation device 110 is configured to receive a plurality of content items simultaneously, for example as a plurality of broadcast channels.

The presentation device 110 can for example be embodied as a television, a set-top box, a decoder, a smartphone or a tablet.

The present principles provide a way to manage the appearance of brightness when switching from one content item to another content item, for example when switching channels. To this end, a measure of brightness of a given content is used. MaxFALL and a drawback thereof have already been discussed herein. Another conventional measure of brightness is Maximum Content Light Level (MaxCLL) that provides a measure of the maximum luminance in a content item, i.e. the luminance value of the brightest pixel in the content item. A drawback of MaxCLL is that it will be high for content having, for example, a single bright pixel in the midst of dark content. MaxCLL and MaxFALL are specified in CTA-861.3 and HEVC Content Light Level Info SEI message. As mentioned, these luminance values are static in the sense that they do not change during the course of a content.

To overcome the drawback of the conventional luminance values, the present principles provide a new luminance value, Recent Frame Average Light Level (RecentFALL), intended to accompany corresponding content as metadata.

RecentFALL is calculated as the average frame average light level, possibly using the same calculation as for MaxFALL, but where MaxFALL is set to the maximum value for the entire content, RecentFALL corresponds to the average frame light level for the most recent L frames (or equivalently K seconds). The value of K could be some seconds, say 5 seconds. As L depends on the frame rate, it would, given K=5 s, be 150 for 30 fps and 120 for 24 fps. These are of course exemplary values and other values are also possible.

RecentFALL is intended to be inserted into, for example, every broadcast channel; i.e. each broadcast channel could carry its current RecentFALL. This metadata could for example be inserted by the content creator or by the broadcaster. RecentFALL could also be carried by OTT content or other content provided by servers on the Internet, but it could also be calculated by any device, such as a video camera, when storing content.

RecentFALL could be carried by each frame, every Nth frame (N not necessarily being a static value) or by each Random Access Point of each content item annotated with this metadata. RecentFALL could also be provided by indicating the change from a previously provided value, but it is noted that the actual value should be provided on a regular basis.

As will be described in detail below, When the content changes, for example when a viewer changes channel, the luminance level to be used for the new content is determined on the basis of the RecentFALL values of frames of the first content and the second content, such as the RecentFALL associated with (e.g. carried by) the most recent frame of the first content and the RecentFALL associated with the first frame of the second content. Then, over a period of time, the adjustment of the luminance is progressively diminished until it is no longer adjusted. This can allow a viewer's visual system to adapt gradually to the new content without surprising jumps in luminance level.

In psychology, it has long been known that for a stimulus presented at a fixed luminance and fora fixed duration, the adaptation level of the observer is related to the product of the presented luminance and its duration (i.e. the total energy to which the observer was exposed); see for example F. A. Mote and A. J. Riopelle. The Effect of Varying the Intensity and the Duration of Preexposure Upon Foveal Dark Adaptation in the Human Eye. J. Comp. Physiol. Psychol., 46(1):49-55, 1953.

If, after full adaption to such a fixed luminance level, the stimulus is removed, then dark adaptation follows, which takes around 30 minutes for full dark adaptation. The curve of dark adaptation as function of time is illustrated in Pirenne M. H., Dark Adaptation and Night Vision. Chapter 5. In: Dayson, H. (ed), The Eye, vol 2. London, Academic Press, 1962.

It can be seen that rods and cones adapt along similar curves, but in different light regimes. In the fovea only cones exist, so the portion of the curve determined by the rods would be absent. As mentioned, dark adaptation curves depend on the pre-adapting luminance, as shown in Bartlett N. R., Dark and Light Adaptation. Chapter 8. In: Graham, C. H. (ed), Vision and Visual Perception. New York: John Wiley and Sons, Inc., 1965.

Further, the effect the duration of the pre-adapting luminance has on dark adaptation as also is shown in Bartlett's article.

It can be seen that shorter durations of pre-adapting luminance result in faster adaptation. These experiments suggest that the more time that has past since exposure to luminance results in a smaller effect on the current state of adaptation. It can thus be assumed that a current state of adaptation of an observer exposed to video content can be approximated by integrating the luminance of past video frames in a weighted manner, so that frames displayed longer ago are given a lower weight than more recent frames. Further, the behaviour observed in the mentioned illustrations is valid for individual cones. The equivalent in terms of image processing would be to integrate each pixel location individually over a certain number of preceding frames. This integration, however, would be equivalent to applying a temporal low-pass filter to each pixel location. Thus, it is in principle possible to determine the state of adaptation of the visual system of an observer exposed to video by applying a low-pass filter to the video itself.

However, it is also observed that the response of neurons in the (human) brain can be well modelled by (generalized) leaky integrate-and-fire models. According to Wikipedia (https://en.wikipedia.org/wiki/Biological_neuron_model#Leaky_integrate-and-fire), neurons exhibit a relation between neuronal membrane currents at the input stage and membrane voltage at the output stage. It is known that neurons leak potential according to their membrane resistance, so that at time t the driving current I(t) relates to the membrane voltage $V_m$ as follows, where $R_m$ is the membrane resistance and $C_m$ is the capacitance of the neuron:

$$I(t) = \frac{V_m(t)}{R_m} + C_m \frac{dV_m(t)}{dt}$$

This is in essence a leaky integrator; see Wikipedia's entry on Leaky integrator. It is possible to multiply by $R_m$, and introduce the membrane time constant $\tau_m = R_m C_m$ to yield (see Wulfram Gerstner, Werner M. Kistler, Richard Naud and Liam Paninski, Neuronal Dynamics—From single neurons to networks and models of cognition):

$$\tau_m \frac{dV_m(t)}{dt} = -V_m(t) + R_m I(t)$$

Assuming that at time t=0 the membrane voltage is at a certain constant value, i.e. $V_m(0)=V$, and that at any time after that the input vanishes, i.e. I(t)=0 for t>0. This is equivalent to a neuron beginning adaptation to the absence of input. For a photoreceptor, this would therefore be the case where dark adaptation begins. The resulting closed-form solution of the equation is then:

$$V_m(t) = Ve^{\frac{-t}{\tau_m}} \text{ for } t > 0$$

It can be seen that this equation qualitatively models the dark adaptation curves illustrated in Pirenne. It is also noted that this equation is essentially equivalent to the model proposed by Crawford in 1947, see Crawford, B. H. "Visual Adaptation in Relation to Brief Conditioning Stimuli." Proc. R. Soc. Lond. B 134, no. 875 (1947): 283-302 and Pianta, Michael J., and Michael Kalloniatis. "Characterisation of Dark Adaptation in Human Cone Pathways: An Application of the Equivalent Background Hypothesis." The Journal of physiology 528, no. 3 (2000): 591-608.

It is therefore reasonable to assume that leaky integration (without the firing component, as photoreceptors do not produce a spike train but are in fact analog in nature), is an appropriate model of the adaptive behaviour of photoreceptors. Moreover, the shape of the curves in the mentioned illustrations from Pirenne and Bartlett can be used to determine the time constant $\tau_m$ of the equations above when modeling dark adaptation.

For values of t approaching 0, the derivative of this function tends to $-v/\tau_m$, so that the initial rate of change can be controlled through the parameter $\tau_m$.

Further, the impulse and step responses of the above differential equation can be examined. To this end, the differential equation is rewritten as:

$$\tau_m(V_m(t)-V_m(t-1))=-V_m(t)+R_m I(t)$$

which in turn can be written as:

$$(\tau_m+1)V_m(t)-\tau_m V_m(t-1)=R_m I(t)$$

Application of the Z-transform yields:

$$(\tau_m+1)V^Z(z)-\tau_m z^{-1}V^Z(z)=R_m I^Z(z)$$

The transfer function H(z) defined as $$H(z) = \frac{V^{Z(z)}}{I^{Z(z)}}$$

is therefore given by:

$$H(z) = \frac{R_m}{1 - \frac{\tau_m}{\tau_m + 1} z^{-1}}$$

From this, it is possible to derive that the impulse response is given by the following equation, see Clay S. Turner, Leaky Integrator:

$$h(n) = R_m\left(\frac{\tau_m}{\tau_m+1}\right)^n$$

The step response is:

$$\tilde{h}(n) = \sum_{i=0}^{n} R_m\left(\frac{\tau_m}{\tau_m+1}\right)^i$$

This equation can (based on Gradshteyn, Izrail Solomonovich, and Iosif Moiseevich Ryzhik. Table of Integrals, Series, and Products. Academic press, 2014) be written as a geometric progression, with the following closed-form solution:

$$\tilde{h}(n) = \sum_{i=0}^{n+1} R_m\left(\frac{\tau_m}{\tau_m+1}\right)^{i-1} = R_m\frac{\left(\frac{\tau_m}{\tau_m+1}\right)^{n+1}-1}{\frac{\tau_m}{\tau_m+1}-1}$$

It is noted that this closed-form solution exists as long as $$\frac{\tau_m}{\tau_m+1} \neq 1.$$

This is guaranteed for all values of $\tau_m \geq 0$.

It is thus possible to further rewrite the rewritten differential equation—$(\tau_m+1)V_m(t)-\tau_m V_m(t-1)=R_m I(t)$—as:

$$V_m(t) = \frac{\tau_m}{\tau_m+1}\left(V_m(t-1)+\frac{I(t)}{C_m}\right)$$

The structure of this equation suggests that the output of the neuron/photoreceptor at time t is a function of the output of the photoreceptor at time t−1, as well as the input I(t) at time t.

For the purpose of implementing this model as a leaky integrator that can be applied to pixel values, the membrane resistance $R_m$ may be set to 1, so that:

$$V_m(t) = \frac{\tau_m}{\tau_m+1}\left(V_m(t-1)+\frac{I(t)}{\tau_m}\right)$$

where t>0. The leaky integrator can be started at time t=0 using the following equation:

$$V_m(0)=I(0)$$

It can then be inferred that the membrane voltage of a photoreceptor is representative of the state of adaptation of said photoreceptor. The membrane time constant can be multiplied by the frame-rate associated with the video.

Further, to apply this model in a broadcast setting, a single adaptation level per frame is preferable, rather than a per-pixel adaptation level. This may be achieved by noting that the steady-state adaptation $L_a(t)$ may be approximated by the geometric average luminance of a frame:

$$L_a(t) = \exp\left(\frac{1}{P}\sum_{p=1}^{P}\log(L_p(t))\right)$$

The steady-state adaptation $L_a(t)$ may also be approximated by other frame averages, such as the arithmetic mean, median, or the Frame Average Light Level (FALL).

Here, a frame consists of P pixels indexed by p. The temporal state of adaptation $L_T(t)$ is then given by:

$$L_T(t) = \frac{\tau_m}{\tau_m+1}\left(L_T(t-1)+\frac{L_a(t)}{\tau_m}\right)$$

Figure 2:
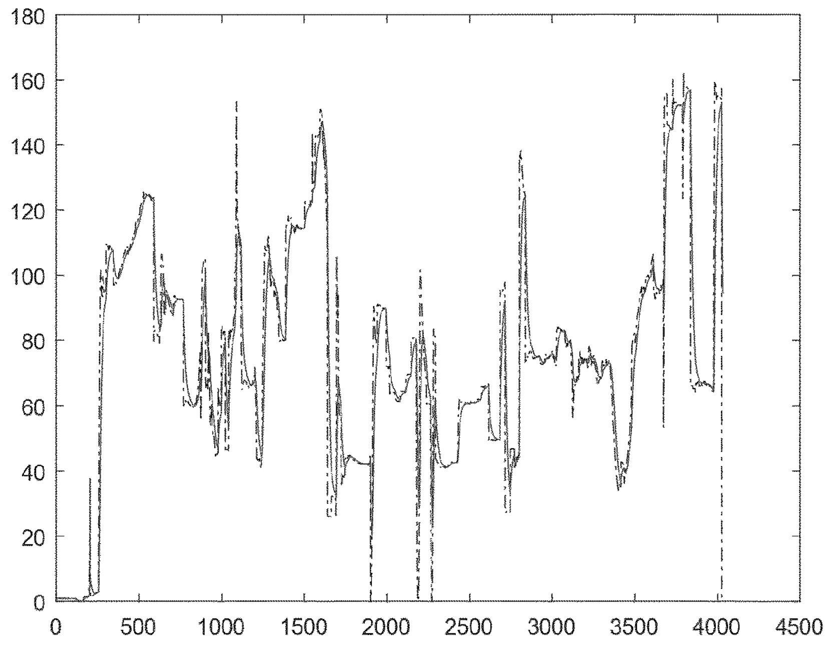
FIG. 2 illustrates a first example of geometric mean frame-average $L_a(t)$ and temporal state of adaptation $L_T(t)$ of a representative movie segment.

With $\tau_m$ set to 0.5 f, where f=24 as a common example of the frame-rate of the video, the geometric mean frame-average $L_a(t)$ and the temporal state of adaptation $L_T(t)$ of a representative movie segment as function of frame number are shown in FIG. 2, with $L_a(t)$ illustrated by a dotted blue line and $L_T(t)$ by the red.

Figure 3:
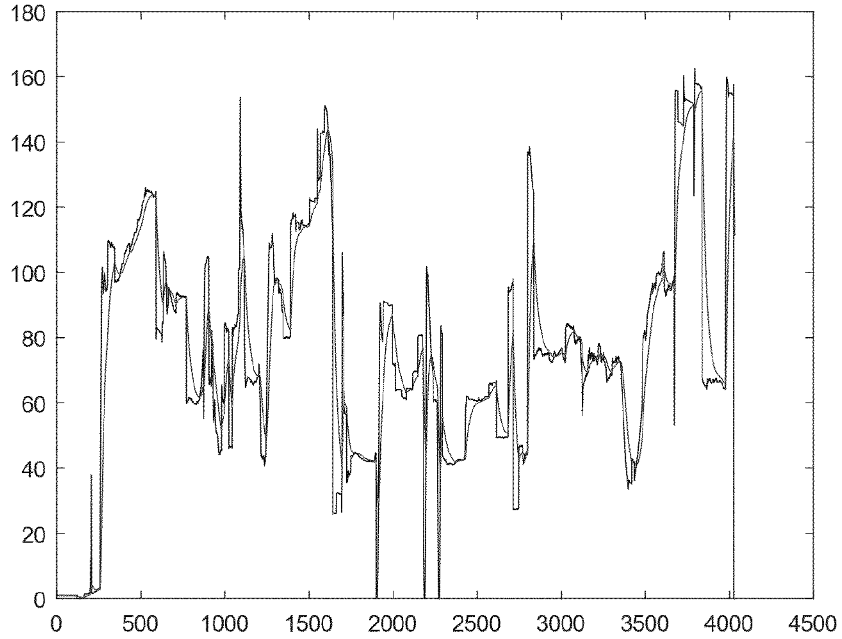
FIG. 3 illustrates a second example of geometric mean frame-average $L_a(t)$ and temporal state of adaptation $L_T(t)$ of a representative movie segment.
Figure 4:
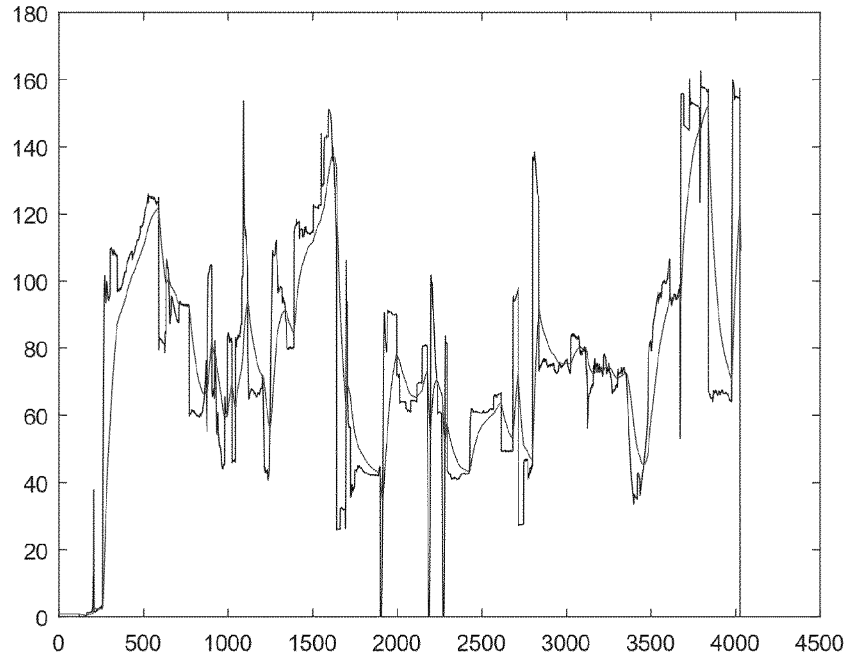
FIG. 4 illustrates a third example of geometric mean frame-average $L_a(t)$ and temporal state of adaptation $L_T(t)$ of a representative movie segment.

A similar graph, with $\tau_m$=f, is illustrated in FIG. 3, while $\tau_m$=2f is illustrated in FIG. 4.

It is noted that it is possible to calculate a temporal state of adaptation $L_T(t)$ from other values than $L_a(t)$ by simply substituting this by, for example, the average luma for a frame.

It is further noted that the effect of applying this scheme is that of a low-pass filter, albeit without the computational complexity associated with such filter operations. It is also noted that, the geometric mean frame-average $L_a(t)$ may be determined for frames that are down-sampled (for example by a factor of 32).

A viewer watching content on a television in a specific viewing environment is likely to be adapted to a combination of the environment illumination and the light emitted by the screen. A reasonable assumption is that the viewer is adapted to the brightest elements in its field of view. This means that high-luminance (e.g. HDR) displays may have a larger impact on the state-of-adaptation of the viewer than conventional (e.g. SDR) displays, especially when displaying high-luminance (e.g. HDR) content. The size of the display and the distance between the user and the display will also have an effect.

An alternative embodiment could be envisaged whereby the above method also takes into consideration elements of the viewing environment. For example, the steady-state adaptation $L_a(t)$ may be modified to include a term that describes the illumination present in the viewing environment. This illumination may be determined by a light sensor placed in the bezel of a television screen. In the case a viewing environment contains Internet-connected light sources, their state may be read and used to determine $L_a(t)$.

The temporal state of adaptation $L_T(t)$ may be used to determine the RecentFALL metadata R(t) through a mapping:

$$R(t)=g(L_T(t))$$

In the simplest case, the mapping may be defined as the identity operator, i.e. g(x)=x. Thus, the RecentFALL metadata is straightforward to compute. The mapping g(x) may further incorporate the notion that the peak luminance of the display may be either above or below the peak luminance implied by the content. For example, if the content is nominally graded at a peak luminance of 1000 cd/m$^2$, a display may clip or adapt the data to, say, a peak luminance of 600 cd/m$^2$. In one example, the function g(x) may apply a normalization to consider the actual light emitted by the screen, rather than the light encoded in the content.

Further, in case the RecentFALL metadata is corrupted during transmission or not transmitted at all, a fall-back solution could be to use the MaxFALL value instead. If MaxFALL is absent too, then generic luminance values may be used, such as for example 18 cd/m$^2$ for SDR content and 37 cd/m$^2$ for HDR content (based on the assumption that HDR content will be graded to a peak luminance of 1000 cd/m$^2$), with a coarse assumption that diffuse white is placed at 203 cd/m$^2$, as discussed in ITU-R Report BT.2408. In this case, switching from an HDR content to a SDR content would mean that $R_1$=37 and $R_2$=18, so that the scale factor for the first frame after the channel change would be approximately 0.49.

The scaling can be applied to a linearized image, i.e. an EOTF (electro-optical transfer function) (or an inverse OETF) is applied after the television has received the image. For SDR content, this function is typically the EOTF defined in ITU-R Recommendation BT.1886, while for HDR content the function may be the EOTFs for PQ and HLG encoded content as defined in ITU-R Recommendation BT.2100.

As can be seen, it is possible to make transitions between content with different luminance, as will be described below.

Figure 5:
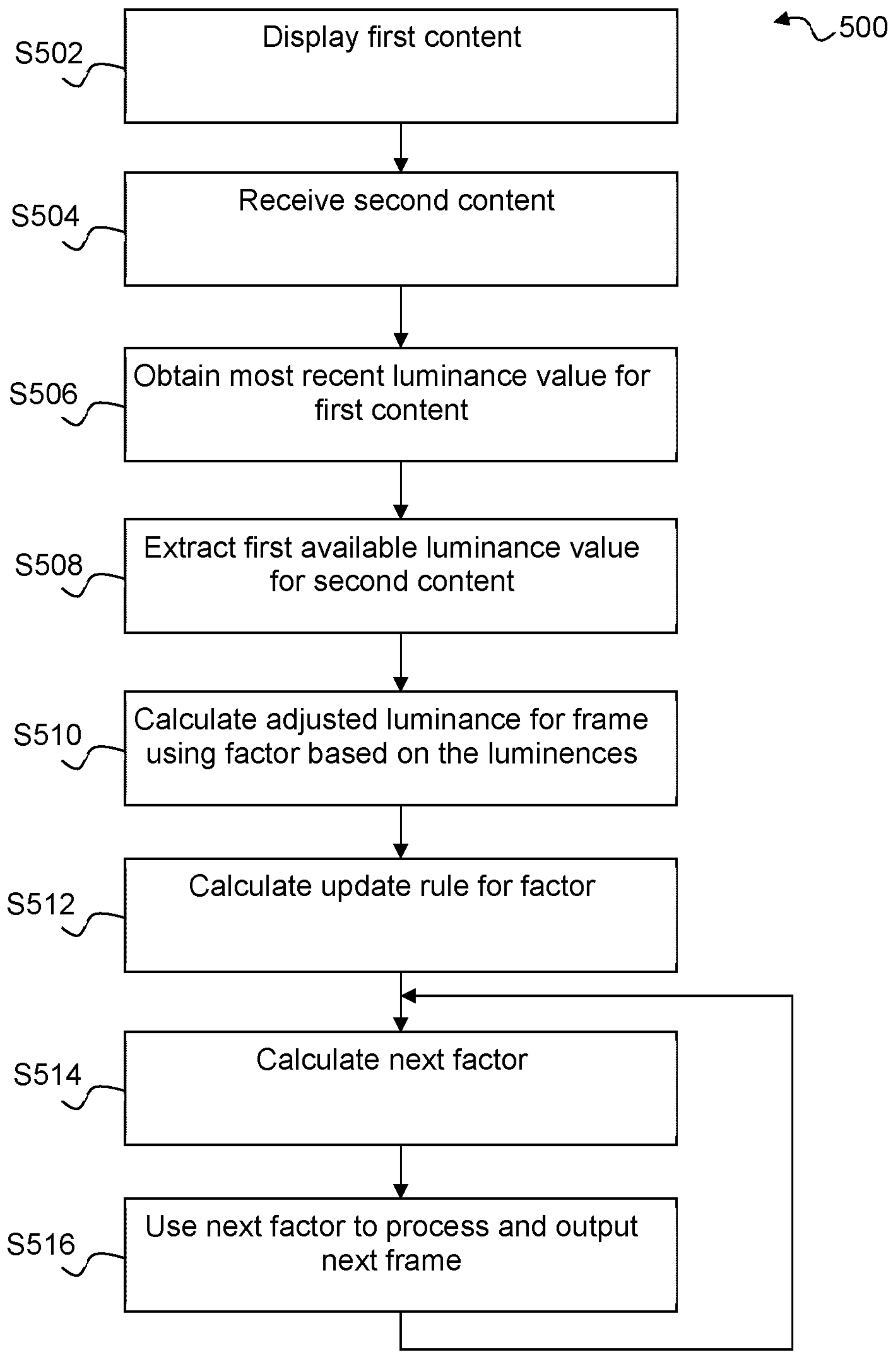
FIG. 5 illustrates a flowchart of a method according to the present principles.

FIG. 5 illustrates a flowchart of a method 500 according to the present principles. The method can be performed by the presentation device 110, in particular processor 112 (in FIG. 1).

In step S502, the presentation device 110 receives a first content through input interface 111. The first content includes a luminance metadata value $R_1$ for the content, preferably RecentFALL. As already described, the metadata value can be associated with each frame (explicitly or indirectly) or with certain, preferably regularly distributed, frames.

It is assumed that the presentation device 110 processes and displays the first content on an associated screen, such as internal screen 115 or, via display interface 114, external screen 140. The processing includes extracting and storing at least the most recent luminance metadata value.

In step S504, the presentation device 110 receives a second content to display at time to. As already discussed, this can be in response to user instructions to switch channel, to switch to a different input source or as a result of a same channel changing content (for example to a commercial).

The second content, too, includes a luminance metadata value $R_2$, preferably calculated like the luminance metadata value for the first content, but for the second content.

In step S506, the processor 112 obtains the luminance metadata value $R_{1,t_0}$ for the most recently displayed frame of the first content. If no value was associated with this frame, then the most recent value is obtained.

In step S508, the processor 112 extracts the first available luminance metadata value $R_{2,t_0}$ associated with the second content. If each frame is associated explicitly with a value, then the first available value is that for the first frame; otherwise, it is the first value that can be found.

It is noted that since the last displayed frame of the first content by nature is displayed before the first displayed frame of the second content, there will be a small time difference; the time to can nevertheless be used to indicate both.

In step S510, the processor 112 then calculates an adjusted "output" luminance to use when displaying the frame, as already described.

To this end, the processor 112 can perform the following calculations.

First, the processor 112 can calculate a ratio $R_{t_0}=R_{1,t_0}/R_{2,t_0}$.

Using the ratio $R_{t_0}$, the processor 112 can then derive a multiplication factor $m_{t_0}$ by which the first frame $I_{t_0}$ of the second content can be scaled. Thus, $m_{t_0}$ is a function of $R_{t_0}$. In one example, this function may be determined as follows:

$$m_{t_0} = \begin{cases} \min\left(R_{t_0}, R_{max}\right) & \text{if } R_{t_0} \geq 1 \\ \min\left(\frac{1}{R_{t_0}}, R_{max}\right) & \text{if } R_{t_0} < 1 \end{cases}$$

where $R_{max}$ is a given maximum ratio intended to avoid too large scalings (for example $R_{max}$=4 which has been found to be an empirically suitable value). It is noted that both $R_{t_0}$ and $m_{t_0}$ are unitless values.

In a variant, upon change of channel, the processor multiplies this calculated multiplication factor with the most recently used multiplication factor, i.e. the multiplication factor used to adjust the luminance of the most recent displayed frame. It is noted that this variant can handle the situation when content is switched anew before full adaptation (e.g. return to 1 of the multiplication factor).

The nominal "input" luminance $I_{in,t_0}$ of the input frame $I_{t_0}$ can be scaled as follows to produce an "output" luminance $I_{out,t_0}$ to be used for displaying the frame:

$$I_{out,t_0}=m_{t_0}I_{in,t_0}$$

In step S512, the processor 112 calculates an update rule for the multiplication factor $m_t$.

The processor 112 can first calculate a rate $\tau_m$ by which the multiplication factor $m_{t_0}$ returns to its default value of 1. The rate $\tau_m$ can be derived as function of the ratio $R_{t_0}$ and can be specified in seconds. The conversion between $R_{t_0}$ and $\tau_m$ can be made in different ways; in one non-limiting example, this mapping can be calculated as:

$$\tau_m=c_1 \log(m_{t_0}+c_2)$$

where $c_1$ and $c_2$ are appropriately chosen constants (for example $c_1$=0.5 and $c_2$=1.1).

For content displayed at a frame-rate f, the update rule for the multiplication factor $m_t$ can then be given by:

$$m_{t_0+1} = \frac{f\tau_m}{f\tau_m+1}\left(\frac{1}{f\tau_m}+m_{\tau_0}\right)$$

In step S514, the processor 112 calculates the multiplication factor for the next frame using, among other things, the multiplication factor for the current frame.

In step S516, the processor 112 processes and outputs the next frame, which includes adapting the luminance based on the multiplication factor.

Steps S514 and S516 can be iterated until the multiplication factor becomes one, or at least close enough to one to be deemed one, after which the method ends.

It can be seen that an effect of this method is that the values $m_{t_0}$ and $\tau_m$ need only be derived from the luminance metadata once when the content changes. Thereafter, the update rule may be applied, and the corresponding frame luminance may be adjusted using this multiplier. After a number of frames, as determined by $f\tau_m$, the multiplier $m_t$ will return to a value of 1 (or, as mentioned, close enough to 1 to be considered to have reached 1).

In an embodiment, the luminance can be scaled as follows:

$$I_{out,t_0+\Delta t} = \begin{cases} I_{in,t_0+\Delta t}\left(\frac{R_{1,t_0}}{R_{2,t_0}}\left(1-\frac{\Delta t}{M}\right)+\frac{\Delta t}{M}\right) & \text{if } \Delta t < M \\ I_{in,t_0+\Delta t} & \text{otherwise} \end{cases}$$

It is assumed here that the content change occurred at frame $t_0$ and that the current frame is frame $t=t_0+\Delta t$.

In a variant, the interpolation between full adjustment and no adjustment is made non-linear, such as for example through Hermite interpolation:

$$I_{out,t_0+\Delta t} = \begin{cases} I_{in,t_0+\Delta t}\frac{R_{1,t_0}}{R_{2,t_0}}H\left(\frac{\Delta t}{M}\right) & \text{if } \Delta t < M \\ I_{in,t_0+\Delta t} & \text{otherwise} \end{cases}$$

with $H(v)=2t^2-3t^2+1$

If, after a change of content, the content is changed again rapidly, i.e. while the luminance is still being adjusted, say within M frames, then instead of using the current luminance metadata value, $R_2$, a derived value $R'_2$ can be used instead:

$$R'_2 = \begin{cases} \frac{R_2}{H\left(\frac{t_c}{M}\right)} & \text{if } t_c < M \\ R_2 & \text{otherwise} \end{cases}$$

where $t_c$ is the frame at which the channel change occurs.

In case the rate $\tau_m$ is constant for a broadcaster and known to the presentation device, then the presentation device may use the following steady-state adaptation level $L_a(t)$ of the observer on the basis of the RecentFALL values of the current frame and of the preceding frame:

$$L_a(t)=(\tau_m+1)R(t)-\tau_m R(t-1)$$

This can allow the presentation device to recover the geometric average luminance of a frame without having to access the values of all the pixels in the frame. Thus, RecentFALL may be used in computations that require the log average luminance. This may, for example, include tone mapping; see for example Reinhard, Erik, Michael Stark, Peter Shirley, and James Ferwerda. "Photographic Tone Reproduction for Digital Images." ACM Transactions on Graphics (TOG) 21, no. 3 (2002): 267-276, and Reinhard, Erik, Wolfgang Heidrich, Paul Debevec, Sumanta Pattanaik, Greg Ward, and Karol Myszkowski. "High Dynamic Range Imaging: Acquisition, Display, and Image-based Lighting. Morgan Kaufmann, 2010. In such applications, a benefit of using RecentFALL is that a significant number of computations may be avoided, which can reduce at least one of memory footprint and latency.

The present principles may also be used in post-production of content to generate a content-adaptive fade between two cuts. This can be achieved by obtaining the adapted luminance for the frames after the cut and then using this luminance when encoding the cuts for release. In other words, when a presentation device receives such content, the content has already been adapted to have gradual luminance transitions between cuts. To do this, at least one hardware processor obtains the two cuts, calculates RecentFALL for them, adjusts the luminance of the second cut as if it were the second content and saves, via a storage interface, the second cut with the adjusted luminance.

As is known, interstitial programs and commercials tend to be significantly brighter than produced or live content. This means that if a programme is interrupted for a commercial break, the average luminance level tends to be higher. In the presentation device, the present method may be linked to a method that determines whether an interstitial is beginning. At such time, the content may be adaptively scaled to avoid the sudden increase in luminance level at the onset of a commercial.

Many presentation devices offer picture-in-picture (PIP) functionality, whereby the major part of the display is dedicated for displaying one channel, while a second channel is displayed in a small inset. In case of a significant mismatch in average luminance between the two channels, these may interact in unexpected ways. The method proposed herein may be used to adjust the inset video to better match the average luminance level of the material displayed on screen, preferably by setting $\tau_0$ and $m_{t_0}$ for each frame of the in-set picture.

The variant related to PIP can also be used for overlaid graphics, such as on-screen displays (OSDs), that may be adjusted to better match the on-screen material. As the RecentFALL dynamic metadata follows the average light level of the content in a filtered manner, the adjustment of the overlaid graphics will not be instantaneous, but it will occur smoothly. This will be more comfortable for the viewer, while never becoming illegible.

In the context of Head-Mounted Displays (HMD—possibly implemented as a mobile phone held in a frame), the human visual system may be much more affected by luminance levels jumps because the "surface of emitting light" to which the eye is exposed appears much higher when closer to the display for a same average of light (the eye integrates the "surface of light"). The present principles and RecentFALL would allow to adapt luminance levels so that the eye has appropriate time to adapt.

The multiplication factor $m_{t_0}$ may be used to drive a tone reproduction operator or an inverse tone reproduction operator that adapts the content to the capabilities of the target display. This approach could reduce the amount of clipping when the multiplication factor is larger than 1 and could also reduce the lack of detail that may occur when $m_{t_0}$ is less than 1.

It will thus be appreciated that the present principles can be used to provide a transition between content that removes or reduces unexpected and/or jarring changes in luminance level, in particular when switching to HDR content.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term “processor” or “controller” should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method for outputting video content for display, the method comprising:

receiving information associated with first video content output for display;

receiving second video content;

adjusting a luminance of a frame of the second video content based on a first luminance value and a second luminance value, the first luminance value obtained from the information and equal to an average frame light level for a plurality of the L most recent frames of the first video content, the second luminance value extracted from metadata of the second video content; and outputting the frame of the second video content for display.

2. The method of claim 1, wherein the first luminance value is equal to an average frame light level for the L most recent frames of the first video content.

3. The method of claim 1, further comprising:

extracting the first luminance value from metadata of the first video content.

4. The method of claim 1, wherein metadata of the first video content comprises a plurality of luminance values, each of the plurality of luminance values associated with a frame of the first video content, wherein the first luminance value is the most recent luminance value associated with a most recently outputted for display frame of the first video content.

5. The method of claim 1, wherein the second luminance value is extracted from metadata associated with a first frame of the second video content.

6. The method of claim 5, wherein the first frame of the second video content is chronologically first in the second video content.

7. The method of claim 1, wherein the luminance of the frame is adjusted by one or more of (a) multiplying the luminance with a multiplication factor calculated using a ratio between the first and second luminance values; (b) Tone mapping, wherein a tone mapper is configured with a parameter determined using a ratio between the luminance values; and (c) inverse tone mapping, wherein an inverse tone mapper is configured with a parameter determined using a ratio between the luminance values.

8. The method of claim 7, wherein the multiplication factor is obtained by taking the minimum of the ratio and a given maximum ratio.

9. The method of claim 7, wherein the multiplication factor is iteratively updated for subsequent frames of the second content as:

$$m_{t_0+1} = \frac{f\tau_m}{f\tau_m + 1}\left(\frac{a}{f\tau_m} + m_{t_0}\right)$$

wherein m is the multiplication factor, $t_0$ and $t_0+1$ are indices, f is related to a frame rate of the video content, a is a constant, and $\tau_m$ is a rate.

10. The method of claim 9, wherein the rate $\tau_m$ is given as a number of seconds or as a number of frames of the video content.

11. A device for outputting video content for display, the device comprising:

an input interface configured to receive second video content; and at least one processor configured to:

receive information associated with first video content output for display;

adjust a luminance of a frame of the second video content based on a first luminance value obtained from the information and equal to an average frame light level for a plurality of the L most recent frames of the first video content and a second luminance value extracted from metadata of the second video content; and output the frame of the second video content for display.

12. The device of claim 11, wherein the first luminance value is equal to an average frame light level for the L most recent frames of the first video content.

13. The device of claim 11, wherein metadata of the first video content comprises a plurality of luminance values, each of the plurality of luminance values associated with a frame of the first video content, wherein the first luminance value is the most recent luminance value associated with a most recently outputted for display frame of the first video content.

14. The device of claim 11, wherein the second luminance value is extracted from metadata associated with a first frame of the second video content.

15. A non-transitory computer readable medium storing program code instructions that, when executed by a processor, implement the steps of a method for outputting video content for display, the method comprising:

receiving information associated with first video content output for display;

receiving second video content;

adjusting a luminance of a frame of the second video content based on a first luminance value and a second luminance value, the first luminance value obtained from the information and equal to an average frame light level for a plurality of the L most recent frames of the first video content, the second luminance value extracted from metadata of the second video content; and outputting the frame of the second video content for display.

16. The non-transitory computer readable medium of claim 15, wherein the first luminance value is equal to an average frame light level for the L most recent frames of the first video content.

17. The non-transitory computer readable medium of claim 15, wherein metadata of the first video content comprises a plurality of luminance values, each of the plurality of luminance values associated with a frame of the first video content, wherein the first luminance value is the most recent luminance value associated with a most recently outputted for display frame of the first video content.

18. The non-transitory computer readable medium of claim 15, wherein the second luminance value is extracted from metadata associated with a first frame of the second video content.

* * * * *